(12) United States Patent
Miyamoto

(10) Patent No.: US 8,908,481 B1
(45) Date of Patent: Dec. 9, 2014

(54) THERMALLY-ASSISTED MAGNETIC RECORDING HEAD THAT SUPPRESSES EFFECTS OF MODE HOPPING

(71) Applicant: HGST Netherlands B.V., Amsterdam (NL)

(72) Inventor: Harukazu Miyamoto, Tokyo (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/165,367

(22) Filed: Jan. 27, 2014

(51) Int. Cl.
*G11B 11/00* (2006.01)

(52) U.S. Cl.
USPC .......................................... 369/13.33

(58) Field of Classification Search
None
See application file for complete search history.

(56) References Cited

U.S. PATENT DOCUMENTS

| | | | |
|---|---|---|---|
| 4,528,670 A * | 7/1985 | Burrus et al. | 372/44.01 |
| 4,720,834 A | 1/1988 | Yamamoto et al. | |
| 4,803,692 A * | 2/1989 | Sakano et al. | 372/50.1 |
| 4,879,724 A | 11/1989 | Matsumoto et al. | |
| 5,022,042 A | 6/1991 | Bradley | |
| 5,444,730 A | 8/1995 | Mizutani | |
| 5,914,978 A * | 6/1999 | Welch et al. | 372/50.22 |
| 6,122,304 A | 9/2000 | Ohyama | |
| 6,320,888 B1 | 11/2001 | Tanaka et al. | |
| 7,088,746 B2 | 8/2006 | Hashimoto et al. | |
| 7,864,635 B2 | 1/2011 | Shimizu | |
| 7,921,436 B2 | 4/2011 | Shimizu et al. | |
| 8,406,093 B2 * | 3/2013 | Iwanabe et al. | 369/13.33 |
| 2006/0002443 A1 * | 1/2006 | Farber et al. | 372/50.1 |
| 2009/0310459 A1 | 12/2009 | Gage et al. | |
| 2011/0128829 A1 | 6/2011 | Nishida et al. | |
| 2011/0164334 A1 | 7/2011 | Jin et al. | |
| 2011/0216635 A1 | 9/2011 | Matsumoto | |

FOREIGN PATENT DOCUMENTS

| | | |
|---|---|---|
| JP | 62001295 | 1/1987 |
| JP | 2000012965 | 1/2000 |
| JP | 2011014214 | 1/2011 |

OTHER PUBLICATIONS

Saga, H. et al., "New Recording Method Combining Thermo-Magnetic Writing and Flux Detection," Japanese Journal of Applied Physics, vol. 38, 1999, pp. 1839-1840.

* cited by examiner

*Primary Examiner* — Brenda Bernardi
(74) *Attorney, Agent, or Firm* — Zilka-Kotab, PC

(57) ABSTRACT

In one embodiment, a device includes a laser unit configured to produce laser light, the laser unit having a laser resonator with a length in a direction parallel to laser light emission and a slider having a length in a direction perpendicular to a media-facing surface of the slider, the slider including a main magnetic pole configured to write data to a magnetic medium, a near-field light-generating element configured to produce near-field light when laser light is provided thereto to assist the main magnetic pole in writing data to the magnetic medium by heating a local region of the magnetic medium, and a waveguide configured for guiding the laser light to the element, the waveguide including a cladding surrounding a core, wherein an interval of a longitudinal mode of the laser resonator is equal to within about 5% of an integer multiplier of an optical interference period of the waveguide.

20 Claims, 14 Drawing Sheets

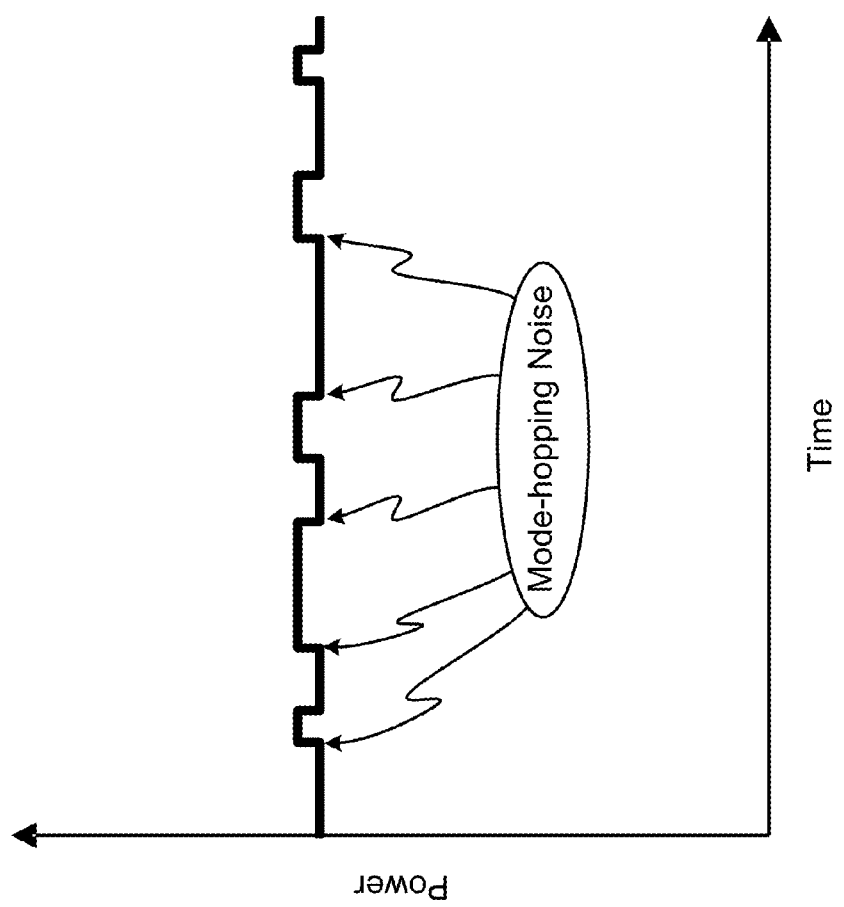

LD = 330 μm x 3.5
WG = 300 μm x 1.9
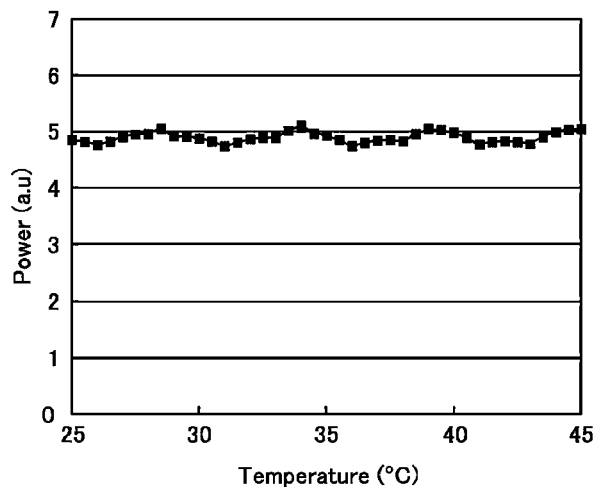
LD = 250 μm x 3.5
WG = 300 μm x 1.9
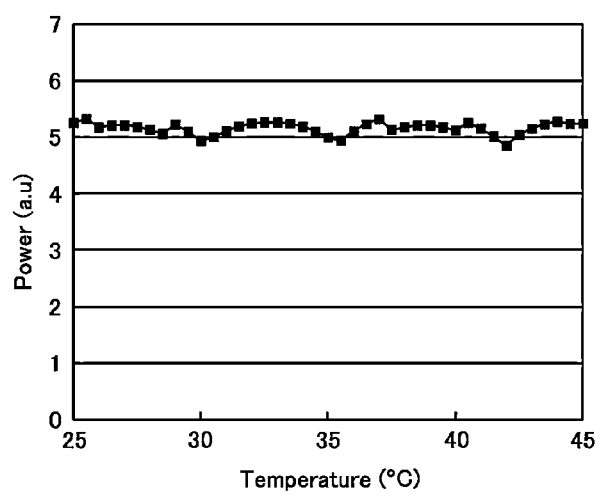
LD = 165 μm x 3.5
WG = 300 μm x 1.9
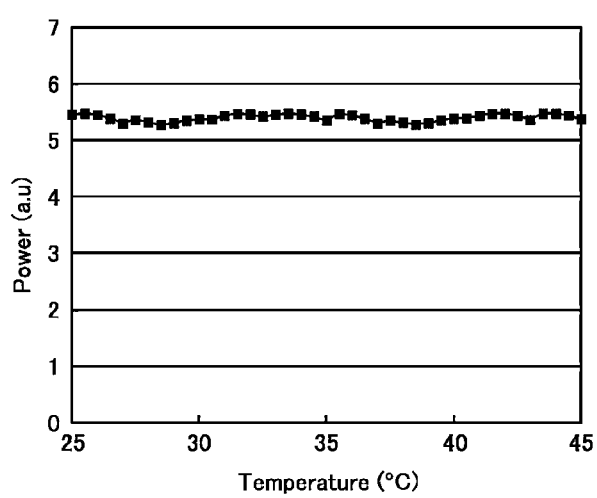
FIG. 9

THERMALLY-ASSISTED MAGNETIC RECORDING HEAD THAT SUPPRESSES EFFECTS OF MODE HOPPING

FIELD OF THE INVENTION

The present invention relates to data storage systems, and more particularly, this invention relates to a thermally-assisted magnetic recording head that suppresses effects of mode hopping and systems and operation thereof.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

One attempt at miniaturizing components has led to the use of thermally-assisted magnetic heads, and a method of recording using these heads has been proposed for implementing high-density magnetic recording of at least 1 Tb/in$^2$ in H. Saga, H. Nemoto, H. Sukeda, and M. Takahashi, Jpn. J. Appl. Phys. 38, Part 1, pp. 1839 (1999). When the recording density exceeds 1 Tb/in$^2$ in a conventional magnetic recording device, the erasure of the recorded information by thermal vibration becomes a problem. In order to prevent this, the coercive force of the magnetic recording medium is increased. However, because the increase is limited to the magnitude of the magnetic field that can be generated by the write head, it is impossible to form recording bits in the medium when the coercive force is too high. As a solution in thermally assisted recording devices, the medium is heated by light at the instant of recording to lower the coercive force. Thus, recording to a high coercive force medium is possible, and a recording density above 1 Tb/in$^2$ may be achieved.

As shown in FIG. 1, a portion of a thermally-assisted magnetic head 100 is shown according to the prior art to help describe the thermally-assisted recording method described above. In this thermally-assisted magnetic head, an area near to the main magnetic pole 102 for applying a magnetic field must be heated. Therefore, a waveguide 104, for example, is formed along the side of the main magnetic pole 102, and semiconductor laser light, which comes from a semiconductor laser light source 106, is guided to the area near to the front end of the main magnetic pole 102.

Various methods have been proposed for mounting the semiconductor laser light source 106. However, a method that mounts the laser light source 106 directly above the slider 108, introduces light into the waveguide 104 formed in the slider 108, and guides the light to a near-field light-generating element 110, such as a transducer, formed in the vicinity of the ABS seems to have the most promise because of an easier implementation with fewer components, a simpler configuration, and lower costs.

The operating principle of thermally-assisted magnetic recording according to this method is that during recording, the laser light source 106 emits light, and the laser light is introduced into the waveguide 104. The light introduced into the waveguide 104 is converted into near-field light that heats only a minute region in the vicinity of the surface of the magnetic recording medium 112 by the near-field light-generating element 110 to heat a local region on the medium 112. By applying the recording magnetic field for modulating the polarity in response to the recorded information simultaneously to increasing the temperature of the local region of this medium 112 via this heating to near the Curie temperature of the magnetic recording film 114 of the medium 112, the direction of magnetization of the local region is aligned in the direction of the recording magnetic field, that is, information may be recorded. To ensure long-term stability of the recorded information in this thermally-assisted magnetic recording method, the anisotropic magnetic field of the medium 112 at room temperature must be sufficiently large. Even if the recording magnetic field is applied to a region that is not heated, the magnetization of that region does not reverse, and only the magnetization of the locally-heated region is reversed. Consequently, ultra-high density recording becomes possible by limiting the size of this heated region to an extremely small region. A near-field light-generating element 110 is used as the heat source for heating extremely small regions.

The size of the near field light irradiated from the near-field light-generating element 110 is uniquely determined primarily by the shape and size of the near-field light-generating element 110 and the distance between the medium 112 and the head 100. In practice, the size of the region being recorded is changed by the temperature distribution determined by the balance between heating by the near field light and heat dispersion in the medium 112. Specifically, to record in only the intended region, the intensity of the heating by the near-field light-generating element 110, that is, the intensity of the laser light irradiated by the near-field light-generating element 110, must be precisely controlled.

For example, a method described in Unexamined Japanese Patent Application No. 2011-14214 proposes a method for precisely controlling this intensity. In this conventional example, by monitoring the increase in the temperature of the near-field light-generating element 110 by the irradiation of light or the temperature of a temperature detection element provided near the near-field light-generating element 110, the energy of the light introduced to the near-field light-generating element 110 is monitored, and based on this information, the output of the laser light source 106 is varied and driven. Specifically, the effects of various fluctuations (temperature fluctuations, fluctuations over time) can be corrected by automatic power control via feedback control to the light source 106.

In practice, however, when the oscillation wavelength of the laser is changed by controlling the temperature variations or the drive current of the laser light source 106, interference conditions in the waveguide 104 in the slider 108 change because the optical interference conditions also change. As a result, the light intensity guided to the ABS fluctuates. The oscillation wavelength of the laser light source 106 is limited to the discrete wavelengths determined by the resonator mode (longitudinal mode) of the laser oscillations, is not necessarily uniquely changed with respect to the temperature or the drive current, and exhibits behavior similar to a type of hysteresis. In addition, the phenomenon referred to as mode hopping is produced in which the oscillation wavelength is changed discretely and in an extremely short time from some longitudinal mode to another longitudinal mode when the wavelength changes, as shown in FIG. 2, according to the prior art.

The speed of this mode hopping is determined by the relaxation oscillation frequency of the laser, but this relaxation oscillation frequency is determined by the oscillation gain of the laser light source 106 and the lifetime of the photons in the laser resonator, and is an extremely fast speed, usually several gigahertz (GHz) (approximately 0.1 ns). Specifically, because the light fluctuations caused by mode hopping occur at a high speed of 1 ns or less, electrical feedback control by drive current control is essentially impossible and incredibly impracticable. In addition, although this mode hopping depends on the generation frequency caused by the temperature of the laser light source 106, the injected current, or the reflected return light, prediction is impossible because the probability of generation is essentially random. When wavelength fluctuations caused by this mode hopping occur in a conventional heat-assisted magnetic head 100, the intensity of light reaching the ABS plane, namely, the assisted light intensity, fluctuates. As a result, the recording conditions fluctuate at high speed. These fluctuations appear in thermally-assisted recording as increases in the recording jitter, decreases in the signal-to-noise ratio (SNR), changes in the recorded track width, and increases in the interference between adjacent tracks—adjacent track interference (ATI). Due to these undesirable effects, the error rate increases.

As a result, the recording density that is achievable using conventional thermally-assisted recording heads decreases substantially. In other words, power fluctuations caused by mode hopping became a large barrier to the implementation of high-density recording by thermal assistance.

SUMMARY

In one embodiment, a device includes a laser unit configured to produce a laser light, the laser unit having a laser resonator with a length (L1) in a direction parallel to laser light emission and a slider having a length (L2) in a direction perpendicular to a media-facing surface of the slider, the slider including a main magnetic pole configured to write data to a magnetic medium, a near-field light-generating element configured to produce near-field light when laser light is provided thereto to assist the main magnetic pole in writing data to the magnetic medium by heating a local region of the magnetic medium, and a waveguide configured for guiding the laser light to the near-field light-generating element, the waveguide including a cladding surrounding a core, wherein an interval of a longitudinal mode of the laser resonator is equal to within about 5% of an integer multiplier of an optical interference period of the waveguide.

In another embodiment, a method for forming a thermally-assisted magnetic head includes forming a slider having a length (L2) in a direction perpendicular to a media-facing surface of the slider, and coupling a laser unit configured to produce a laser light to the slider, the laser unit including a laser resonator having a length (L1) in a direction parallel to laser light emission, wherein the slider includes a main magnetic pole configured to write data to a magnetic medium, a near-field light-generating element configured to produce near-field light when laser light is provided thereto to assist the main magnetic pole in writing data to the magnetic medium by heating a local region of the magnetic medium, and a waveguide configured for guiding the laser light to the near-field light-generating element, the waveguide including a cladding surrounding a core, wherein an interval of a longitudinal mode of the laser resonator is equal to within about 5% of an integer multiplier of an optical interference period of the waveguide.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2 is a plot of a power versus time for a conventional thermally-assisted magnetic head experiencing mode hopping.

FIG. 9 shows a working example of power fluctuations when the temperature of the magnetic head is changed.

DETAILED DESCRIPTION

Figure 1:
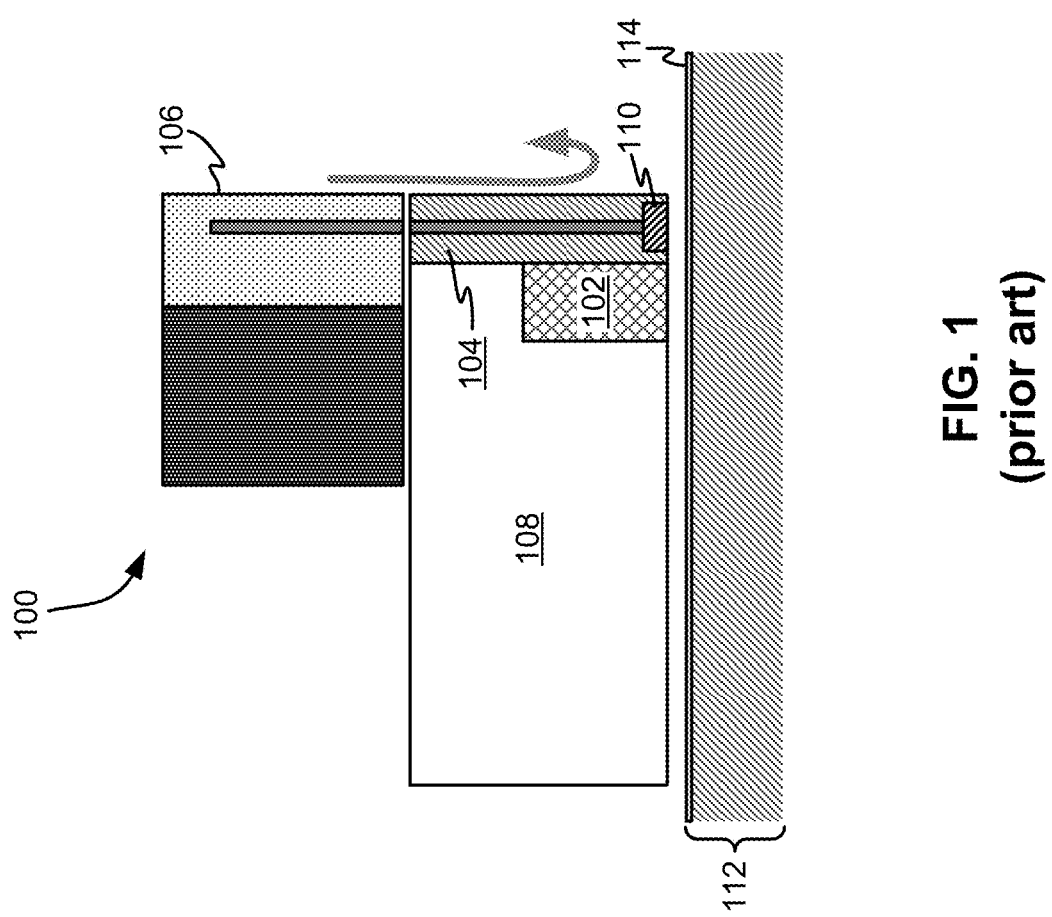
FIG. 1 shows a portion of a thermally-assisted magnetic head according to the prior art.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The term "about" as used herein refers to any reasonable value range encompassing the stated value. For example, in some approaches "about X" may refer to X±10% of X.

The following description discloses several preferred embodiments of disk-based storage systems and/or related systems and methods, as well as operation and/or component parts thereof.

The thermally-assisted magnetic heads and methods of use thereof, described herein according to various embodiments, have been shown to suppress power fluctuations caused by mode hopping of the laser light source or laser unit that has been identified as a problem in conventional thermally-assisted recording heads and methods of use thereof.

In one general embodiment, a device includes a laser unit configured to produce a laser light, the laser unit having a laser resonator with a length (L1) in a direction parallel to laser light emission and a slider having a length (L2) in a direction perpendicular to a media-facing surface of the slider, the slider including a main magnetic pole configured to write data to a magnetic medium, a near-field light-generating element configured to produce near-field light when laser light is provided thereto to assist the main magnetic pole in writing data to the magnetic medium by heating a local region of the magnetic medium, and a waveguide configured for guiding the laser light to the near-field light-generating element, the waveguide including a cladding surrounding a core, wherein an interval of a longitudinal mode of the laser resonator is equal to within about 5% of an integer multiplier of an optical interference period of the waveguide.

In another general embodiment, a method for forming a thermally-assisted magnetic head includes forming a slider having a length (L2) in a direction perpendicular to a media-facing surface of the slider, and coupling a laser unit configured to produce a laser light to the slider, the laser unit including a laser resonator having a length (L1) in a direction parallel to laser light emission, wherein the slider includes a main magnetic pole configured to write data to a magnetic medium, a near-field light-generating element configured to produce near-field light when laser light is provided thereto to assist the main magnetic pole in writing data to the magnetic medium by heating a local region of the magnetic medium, and a waveguide configured for guiding the laser light to the near-field light-generating element, the waveguide including a cladding surrounding a core, wherein an interval of a longitudinal mode of the laser resonator is equal to within about 5% of an integer multiplier of an optical interference period of the waveguide.

According to one embodiment, a thermally-assisted magnetic recording head comprises at least a magnetic recording slider provided with at least a magnetic field generating element (a main magnetic pole) and an optical waveguide for guiding light to an optical heater (element) provided near to a magnetic near-field light-generating element, and a laser unit for generating and introducing light to the optical waveguide, a wavelength interval of the oscillating longitudinal mode of the element of the laser unit being matched to an integer multiple of a wavelength period of the optical interference of the light propagated by the optical waveguide.

The laser unit does not oscillate at wavelengths other than the wavelengths present in the longitudinal mode; therefore, the hopping of the wavelength caused by mode hopping of the laser unit always becomes an integer multiple of the longitudinal-mode interval and matches an integer multiple of the wavelength period of the optical interference of the light propagated by the optical waveguide. For example, even if mode hopping is created, and wavelength fluctuations are generated, essentially, an identical state is maintained although the interference state of the light differs by an integer multiple of the wavelength period of the optical interference. As a result, fluctuations are not generated in light power.

In practice, as in the description of the approximate integer multiple, perfect control to an integer multiple cannot be implemented because of manufacturing errors, tolerances, etc. For example, by controlling to approximately n±0.05 times (with n=an integer), approximately 5% or less when the fluctuating power is not controlled to an integer multiple is sufficient suppression to a satisfactorily low level, which does not present a problem in practice and greatly enhances the performance of the thermally-assisted magnetic head. The optical heater (element) specifically includes a near-field light-generating element, such as a transducer. Various near-field light-generating elements are possible, and the embodiments described herein are not limited to those specific structures described herein, but may include any possible near-field light-generating element known in the art. The performance improvements attainable using embodiments described herein do not depend on the types of near-field light-generating element used. In addition, the optical waveguide may be a composite optical element that specifies a functional structure for guiding light to the vicinity of the near-field light-generating element and may include functional mechanisms, such as a light-focusing functional mechanism, a polarization control functional mechanism, etc., in addition to a waveguide. Even if a spatial waveguide optical system is included in a portion of the structure, the performance improvements are still attainable and are essentially identical.

Furthermore, in one approach, when the light wavelength of the resonator of the laser unit is $L_{LD}$, and the optical wavelength of the waveguide is $L_{WG}$, $L_{WG}$ becomes approximately an integer multiple of $L_{LD}$, e.g., $L_{WG}=n*L_{LD}$. Also, the longitudinal mode interval of the laser resonator having an optical wavelength of $L_{LD}$ when the oscillation wavelength of the laser is $\lambda$ may be calculated as: $\lambda^2/(2*L_{LD})$. In addition, the interference period of the waveguide having an optical wavelength of $L_{WG}$ may become: $\lambda^2/(2*L_{WG})$.

Consequently, by setting $L_{WG}$ to approximately an integer multiple of $L_{LD}$, essentially identical conditions as described above are satisfied because the longitudinal mode interval becomes an integer multiple of the interference period of the waveguide, and the effects obtained are essentially identical to those described previously. The optical length is usually represented by the product of the refractive index and the length. In the waveguide, an effective refractive index that considers the leakage from the waveguide core to the cladding is used.

In another embodiment, when the optical wavelength of the waveguide is $L_{WG}$, the structure of the laser unit may have an auxiliary resonance structure having a light wavelength, $L_{SUB}$, of an integer fraction of $L_{WG}$, e.g., $L_{SUB}=1/m*L_{WG}$. By using a structure having a sub-resonator shorter than this type of laser resonator, a portion of the longitudinal mode of the normal laser unit determined by $L_{LD}$ is suppressed. A period longer than the optical length of the sub-resonator determined by $L_{SUB}$ becomes the longitudinal mode of the laser unit. Specifically, it becomes possible to maintain a wider longitudinal mode interval even when a laser unit having a relatively long resonator is used. As a result, the interval of the longitudinal mode becomes easy to maintain as an integer multiple of the period of the interference of the waveguide.

In a further approach, by letting the effective refractive index (propagation constant) of the waveguide in the slider be $n_{WG}$, the length of the waveguide be $h_{WG}$, the effective refractive index (propagation index) of the waveguide in the laser be $n_{LD}$, and the length of the resonator be $h_{LD}$, then the relationship $n_{WG}*h_{WG}=n_{LD}*h_{LD}$ is satisfied. Furthermore, structures, lengths, widths, materials, etc., may be chosen in order to maintain this relationship in the thermally-assisted magnetic head.

The effective length of the waveguide in the slider may be longer than 1.5 times the length of the resonator of the laser, in another approach.

In contrast to the refractive index of a near infrared semiconductor laser resonator being approximately 3.5, the equivalent refractive index of the waveguide in the slider may be 2.3 when large and may be about 2.0 on average. Consequently, to match the optical length of the resonator of the laser unit and the optical length of the waveguide in the slider, the length of the waveguide may be at least 1.5 times the length of the laser resonator. Usually, however, a thickness of the slider in the magnetic head is 230 μm or 180 μm. The length of the resonator of a typical front end light-emitting laser unit is at least 250 μm to even 300 μm, and is longer than the thickness of the slider. Therefore, in order to lengthen the optical length of the waveguide, the waveguide length of the waveguide in the slider is made to be longer than a thickness of the slider.

Figure 3A:
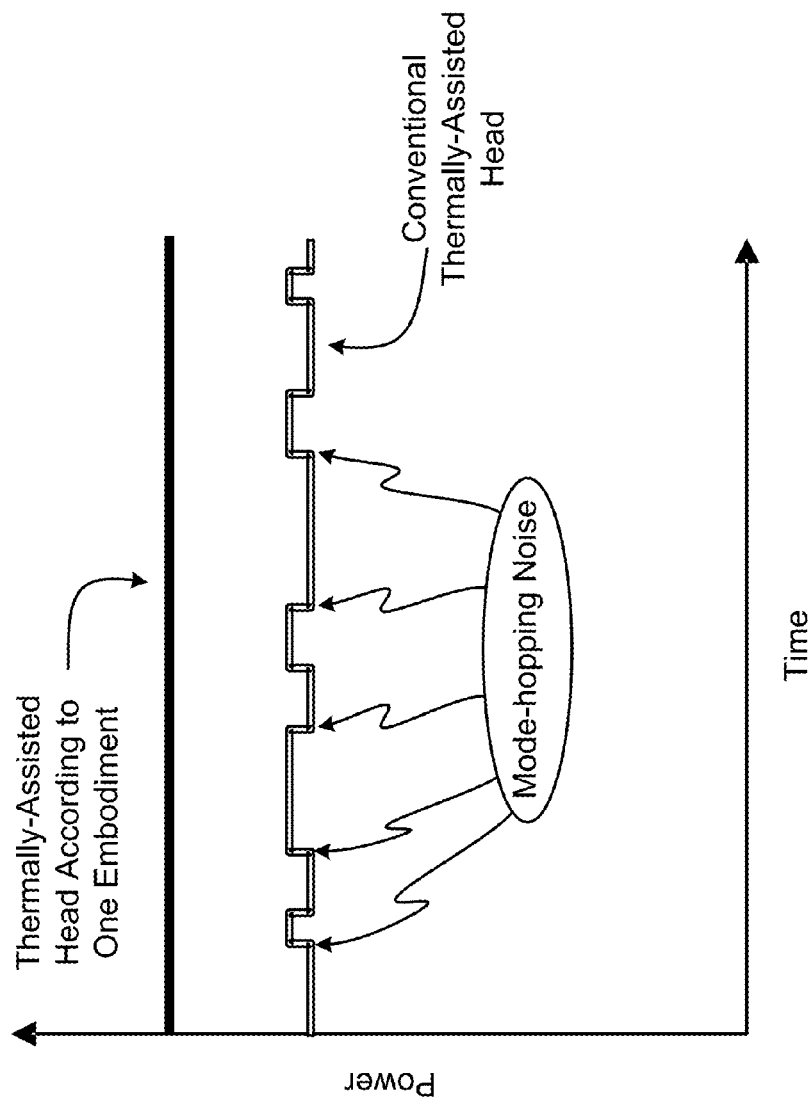
FIG. 3A is a plot comparing power versus time for a conventional thermally-assisted magnetic head experiencing mode hopping and a thermally-assisted head according to one embodiment.
Figure 8A:
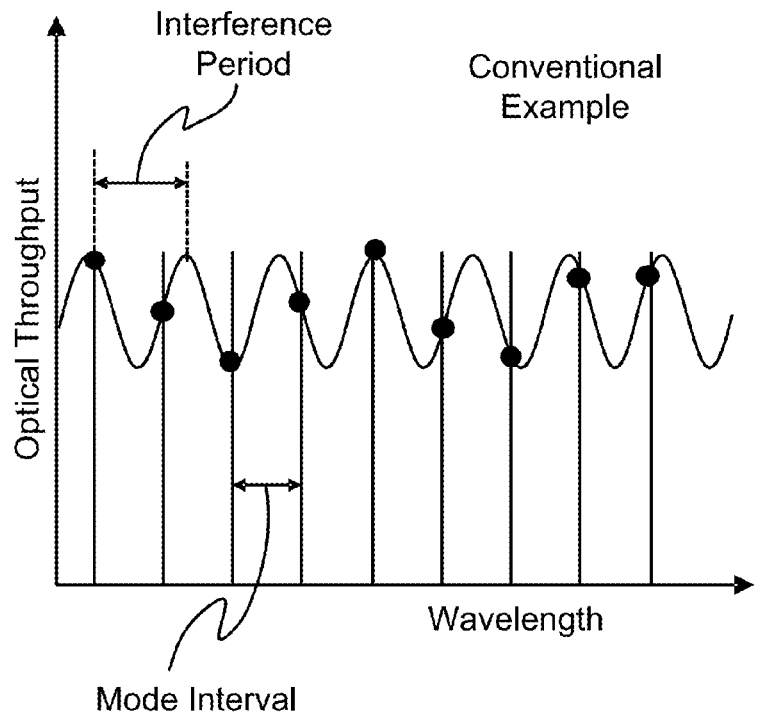
FIGS. 8A-8B show plots of optical throughput versus wavelength for a conventional waveguide structure and a waveguide structure according to one embodiment.
Figure 8B:
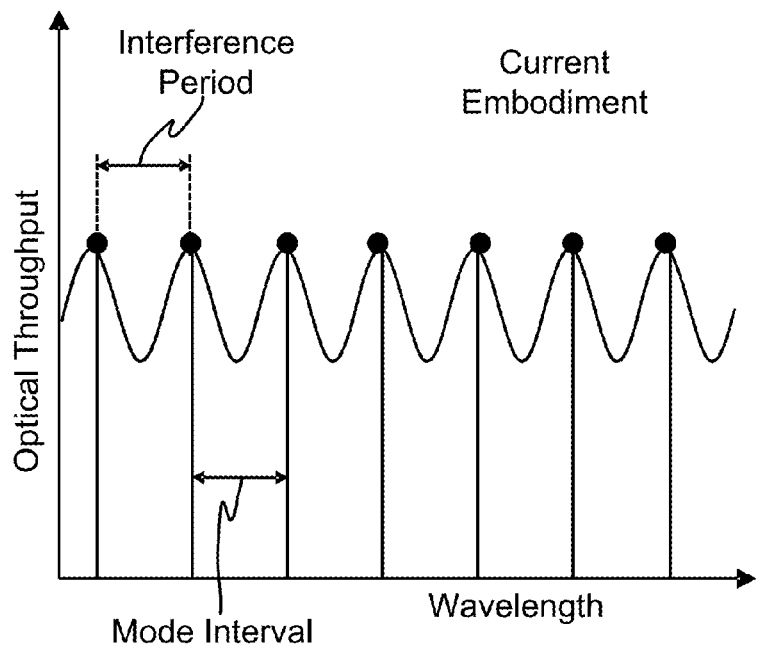

A useful principle in solving the above problems of conventional thermal-assistance techniques based on conventional thermally-assisted magnetic heads is explained below in detail. The oscillation mode (longitudinal mode) of the laser unit is determined by the optical path length of the resonator of the laser unit. The wavelength of the longitudinal mode becomes an integer fraction of the optical path length of the resonator. Consequently, the wavelength interval may be controlled by the selection of the resonator length of the laser unit. In addition, the optical interference in the slider is generated periodically for wavelength fluctuations, and this period is determined by the effective optical path length of the waveguide in the slider. Thus, by selecting the length of the resonator of the laser unit and the optical path length of the waveguide in the slider, the interval of the oscillation mode of the laser unit and the period of optical interference in the waveguide in the slider may be matched. Even when the longitudinal mode of the laser unit changes (e.g., due to mode hopping), fluctuations in the assisted power are effectively suppressed because the interference conditions of periodic optical interference are always maintained at the same conditions, as shown in FIGS. 3A and 8A-8B.

In thermally-assisted recording (TAR), one problem involving the light delivery system shown in FIG. 1 that guides the laser light through the waveguide until near the air bearing surface (ABS) or media-facing surface is the intensity of the guided light, namely, stabilization of the assist intensity. Various methods having different coupling methods of the laser unit and the waveguide, shapes of the waveguide, coupling methods of the waveguide and the near-field light-generating element, and loading methods of the laser unit have been proposed for the light delivery system.

In any light delivery system, there are shared problems which include thermal assist methods that do not use a near-field light-generating element when the laser light couples to the waveguide, and the light is guided to the terminal end of the waveguide placed near the plane of the media facing side. The intensity of the light at the terminal end of the waveguide depends on the effects of various types of optical interference, in addition to depending on power fluctuations of the laser unit itself. The power fluctuations of the laser unit are primarily caused by unstable oscillation modes of the laser unit caused by the effects of the returned light created by the emitted light of the laser unit reflected by the waveguide, in addition to operating environment variations such as temperature fluctuations, drive current fluctuations, etc. Variations in the operating environment, such as the temperature, may be suppressed by monitoring the actual emitted light intensity and the ambient temperature through feedback control. Because the fluctuations in the oscillation mode of the laser unit occur occasionally, prediction and control are very difficult. However, a laser unit may be implemented so that there is almost no variations in the laser intensity even when fluctuations occur in the oscillation mode.

However, by varying the oscillation mode in a thermally-assisted magnetic head, the effective efficiency is changed by fluctuations in the oscillation mode, namely, fluctuations in the oscillation wavelength, that are caused by the wavelength dependence of the optical elements, such as the waveguide. As a result, large fluctuations in the assist intensity occur. The oscillation wavelength of the laser unit is limited to the wavelength (longitudinal mode) of an integer fraction of the effective length (optical length) of the resonator of the laser unit. Specifically, the wavelengths that may be oscillated by the laser unit are discrete, and, essentially, fluctuations of the wavelength are generated discontinuously. This discontinuous change appears in the assist intensity (power) of conventional thermally-assisted magnetic head systems, as shown in FIG. 2. The fluctuations in the assist intensity must be suppressed in high-density recording because these fluctuations appear as fluctuations in the recording mark width and transition fluctuations, specifically, as jitter, which is undesirable in magnetic recording systems.

However, the primary component of the wavelength dependence of the waveguide is periodic with respect to wavelength fluctuations. Therefore, the interval of the discrete longitudinal modes is matched to the period of the wavelength fluctuations in one embodiment. Thus, even when the oscillation state of the laser unit fluctuates as shown in FIG. 8B and transitions to any wavelength of the discrete longitudinal mode, the transition is to the same phase state with respect to the wave of periodic wavelength fluctuations, namely, the same interference conditions, and power fluctuations are not generated. In a conventional example as shown in FIG. 8A, the optical power, namely the output efficiency (throughput) of the waveguide, fluctuates greatly at the waveguide terminal end caused by longitudinal mode transitions. In other words, power fluctuations at the waveguide terminal end caused by mode hopping may be essentially eliminated in comparison to conventional techniques by using the embodiments described herein.

The period of the interference of the waveguide and the interval of the longitudinal mode of the laser unit may be implemented by matching the optical path length of the two as follows, in several embodiments.

First, the period (p) of the optical interference of the waveguide is calculated as: $p=\lambda^2/(2n_{WG}*h_{WG})$, where the waveguide optical length is $h_{WG}$, and the average effective refractive index (propagation constant) of the waveguide is $n_{WG}$. Then, the longitudinal mode interval Δ of the laser unit may be calculated as: $\Delta = \lambda^2/(2n_C \cdot h_C)$, where the resonator length is $h_C$, and the average effective refractive index (propagation constant) of the laser resonator is $n_C$.

Specifically, when p=Δ in order to match the period, $n_{WG} \cdot h_{WG} = n_C \cdot h_C$ is satisfied. $n_{WG} \cdot h_{WG}$ is the optical length of the waveguide in the slider. $n_C \cdot h_C$ is the optical length of the laser resonator. Therefore, it is clear that the effective optical path lengths of the waveguide in the slider and the laser resonator may match. Instead of matching the interference period (p), the interval of the longitudinal mode may be set as an integer multiple k of the interference period, that is, the same effect as k·p=Δ is obtained. As in $n_{WG} \cdot h_{WG} = k \cdot n_C \cdot h_C$, the optical path lengths of the waveguide and the laser resonator may be selected.

Second, the possibility of realizing the conditions described above is examined. When the refractive index of the waveguide in the slider is about 2.0, and the thickness of the slider is 230 μm, the optical path length is 460 μm. When the center wavelength of the laser is 830 nm, the wavelength period of the interference becomes 0.75 nm. Because the refractive index of GaAa, which is a typical material for a near infrared laser, is approximately 3.5, when the resonator length of the laser is 360 μm/3.5=130 μm, the condition of matching the optical path length is satisfied.

Specifically, the longitudinal mode interval may be about 0.75 nm. The resonator length of 130 μm is somewhat shorter than an ordinary laser unit, but is within an achievable range. Instead of shortening the resonator of the laser, another effective method is to lengthen the effective waveguide length by bending the waveguide in the slider in one embodiment, and/or to provide a second Fabry-Perot interference structure corresponding to approximately 130 μm in the laser unit, and to sample the longitudinal mode of the laser unit. For example, by setting the resonator length of the laser unit to 260 μm and providing a structural modification having a width of about 100 nm at nearly the center position, the odd modes are effectively suppressed, and the longitudinal mode interval may be doubled.

Specifically, a laser unit having a resonator length of 260 μm may be used to achieve a longitudinal mode interval equivalent to that of a 130 μm laser, and may match the interference period of the waveguide. To obtain the effects described herein, preferably, the interference period of the waveguide and the longitudinal mode interval should match as much as possible. If kept to a difference within about 5%, or more preferably within about 2%, the effects are nearly identical. The reason for this is that the maximum fluctuation is kept to about 5% by suppressing discontinuous hops of the longitudinal mode to a difference within about 2% or less because the hops are usually limited to within about 1 nm to about 2 nm (two to three times the longitudinal mode interval).

Figure 3B:
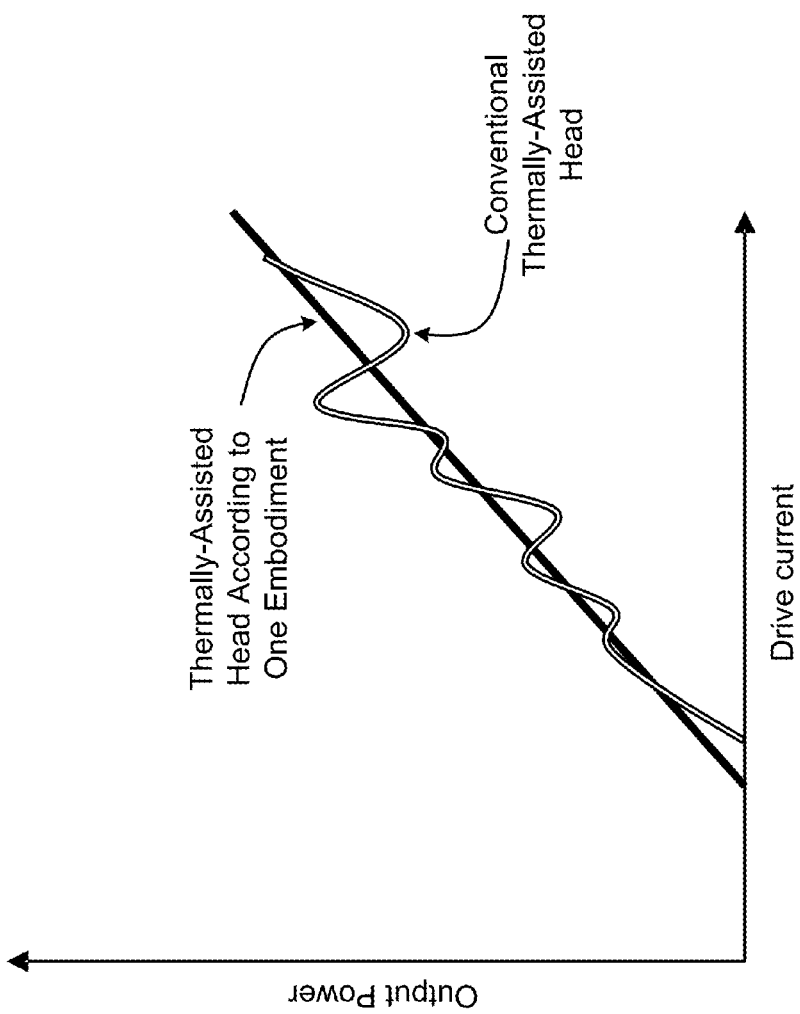
FIG. 3B is a plot comparing output power versus drive current for a conventional thermally-assisted magnetic head and a thermally-assisted head according to one embodiment.

FIG. 3B shows an example of the effects of a structure formed as described herein according to one embodiment in comparison to a conventional structure. This shows the optical power at the terminal end of the waveguide when the drive current of the laser unit is varied. In the conventional example, the effective efficiency of the waveguide changes, and the relationship between the drive current and the output power is not linear because the wavelength of the laser unit changes and the interference conditions change when the power changes the drive current. When a structure as described herein according to various embodiments is used, the output power becomes perfectly linear to the drive current because the interference condition is maintained and the efficiency of the waveguide does not change even when the wavelength changes. This shows that the assist power may be precisely controlled by feedback control using a structure as described herein according to various embodiments.

Figure 10:
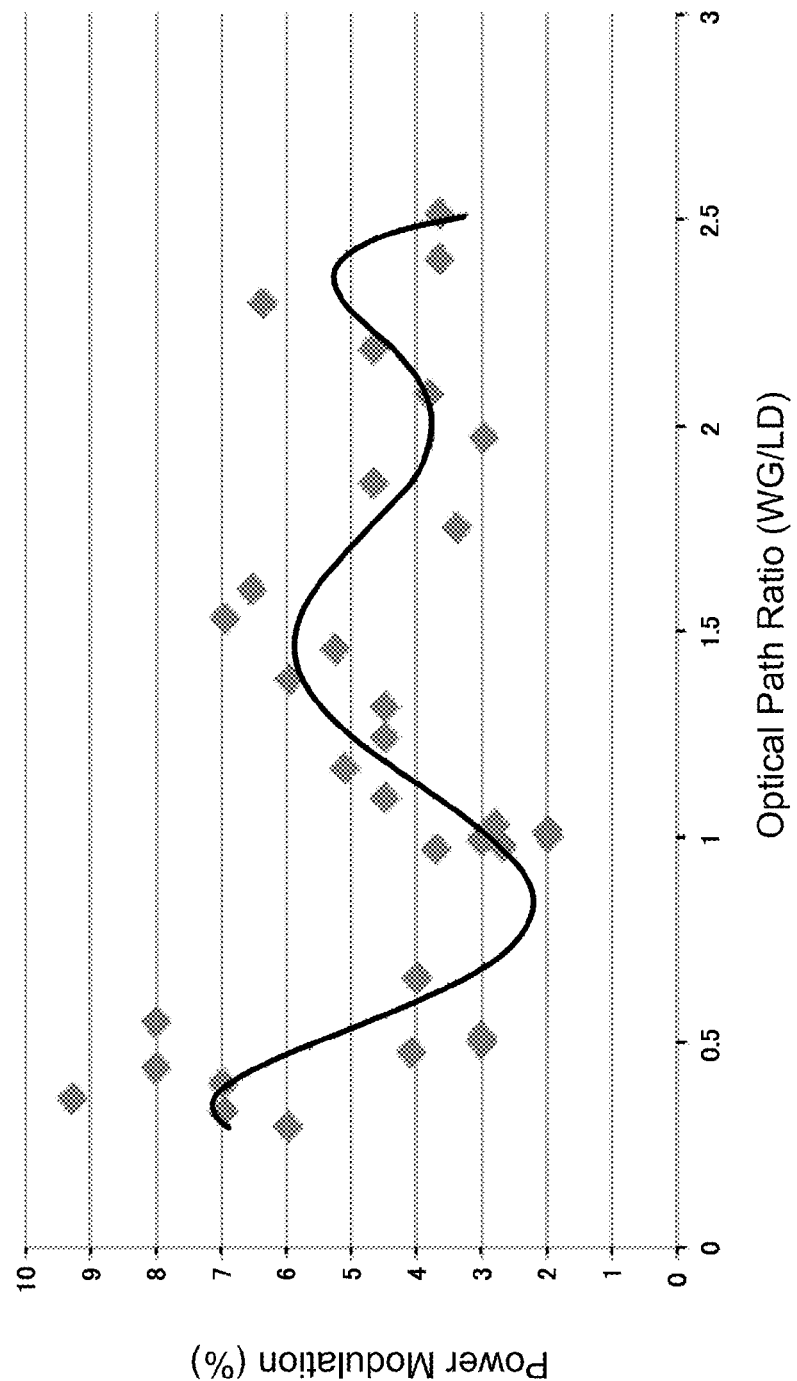
FIG. 10 shows a diagram for examining a relationship of maximum values of power fluctuations with respect to an optical length ratio of the laser unit resonator and the waveguide.

FIG. 10 summarizes the maximum values of the optical power fluctuations at the terminal end of the waveguide when the optical length ratio of the laser resonator and the waveguide is changed. When the optical length ratio is approximately an integer multiple, the effect of reducing power fluctuations is exhibited.

Figure 4:
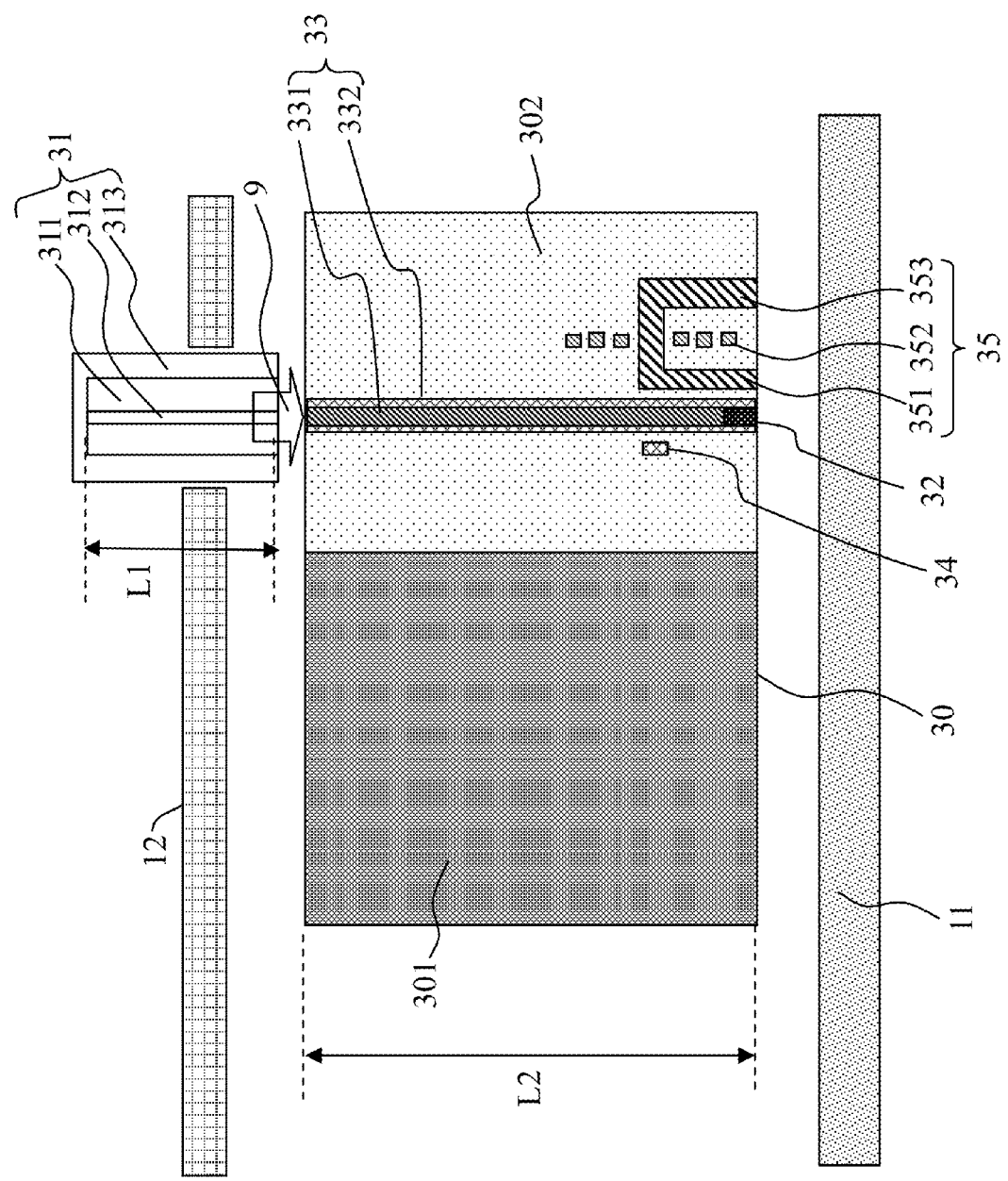
FIG. 4 is a schematic view of a thermally-assisted magnetic head according to one embodiment.
Figure 5:
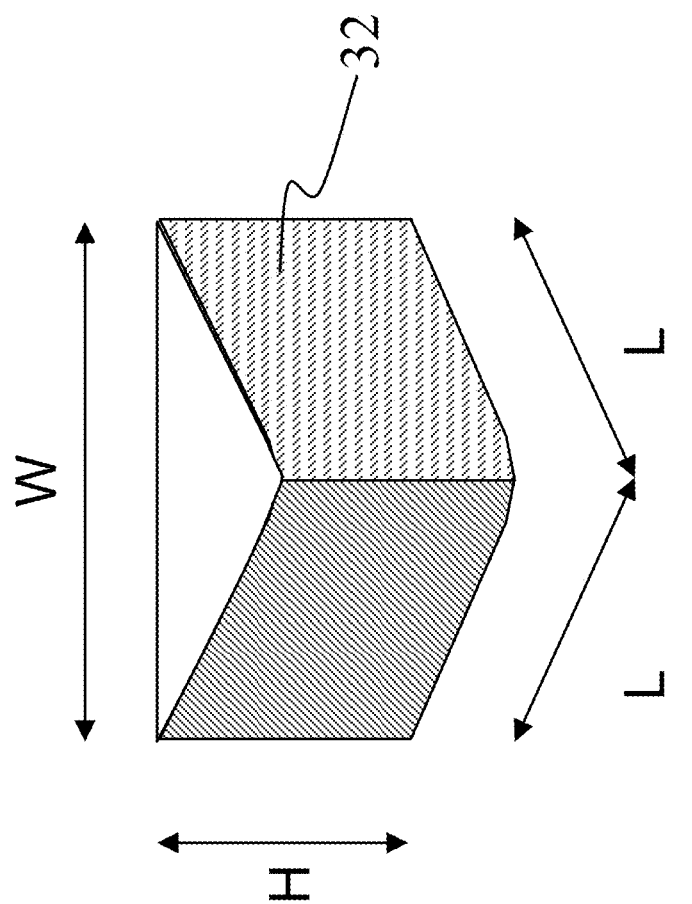
FIG. 5 shows the structure of a near-field light-generating element according to one embodiment.

Now referring to FIG. 4, a schematic view of a read/write head according to one embodiment is shown. A laser unit 31, such as a laser diode or some other suitable laser light source, is provided and/or coupled to the slider 30 that utilizes a near-field light-generating element 32 positioned near the media facing side of the slider 30 as the light generation and introduction element on the surface opposite the media facing side of the slider 30. The laser unit 31 may generate light having a wavelength of about 830 nm. Particular components may be formed in the slider 30 on a substrate 301 which may comprise AlTiC or some other suitable material.

The laser unit 31 may be used to produce laser light, and may comprise a laser chip 311, a laser resonator (stripe) 312, and a sub-mount 313 having a length (L1). The light emitted from the laser unit 31 passes through the waveguide 33 and irradiates the near-field light-generating element 32 which provides heating to a magnetic recording medium 11. The waveguide 33 may be fabricated from a cladding 332 comprising $Al_2O_3$ (or some other suitable material known in the art) having a refractive index of about 1.6 as a cover surrounding a core 331 of $Ta_2O_5$ (or some other suitable material known in the art) having a width of about 500 nm, a height of about 300 nm, a length (L2) and a refractive index of about 2.1 for introducing light having a wavelength of about 830 nm to the magnetic medium 11. Furthermore, the waveguide 33 may be formed within a filler material 302, such as alumina or some other suitable material.

A power sensor 34 may be used to determine power of the laser light, while a magnetic write head 35 is used to write data to the magnetic medium 11, the write head 35 comprising a main magnetic pole 351, a coil 352, and a yoke 353.

In this waveguide 33, the mode diameter of the guided light is nearly the same size as the waveguide core. Specifically, the energy of the guided light is essentially confined within the core. The near-field light-generating element 32 of this embodiment may comprise any suitable material known in the art, such as gold (Au), having a shape of an isosceles triangular pyramid (shown in more detail in FIG. 4 according to one embodiment), and has a base width (W) of about 100 nm, a hypotenuse (L) of about 130 nm, and a height (H) of about 200 nm. The apex part of the isosceles triangular pyramid may be processed to an arc having a radius of curvature of about 10 nm, and the spot diameter of the generated near-field light becomes about 25 nm.

Referring again to FIG. 10 and FIG. 11, although details are not shown, a spot size converting structure for increasing the coupling efficiency when light from the laser unit 31 falls incident on the waveguide 33 may be formed right below the laser unit 31. By irradiating light coupled to the waveguide 33, the near-field light-generating element 32 emits near-field light at the media facing side (e.g., at the recording medium 11 surface) according to the plasmon resonance principle, and the temperature of the surface of the medium 11 increases. When the power of the light irradiating the near-field light-generating element 32 is about 5 mW, the local temperature of the magnetic film of the medium 11 surface rises to about 400° C., according to results obtained from a structure according to this embodiment.

In this structure, the thickness (L2) of the slider may be about 230 μm, and the refractive index of the waveguide 33 in the slider 30 may be about 2.0. Thus, the optical path length of the waveguide 33 may be about 460 μm. The light reflected at both ends of the waveguide 33 undergoes multiple reflections in the space between the ends of the waveguide 33 separated by an optical path length of about 460 μm while confined within the waveguide 33. This may be regarded as a Fabry-Perot interferometer. The interference period or free spectrum range of a Fabry-Perot interferometer (waveguide) becomes 0.75 nm for laser light having a wavelength of 830 nm. The refractive index of GaAs, which is a typical material of a near infrared laser, is about 3.5. Therefore, in this embodiment, the resonator length of the laser unit 31 is 460/3.5=about 130 μm. Thus, the optical length of the waveguide 33 matches the optical length of the laser resonator. In other words, the longitudinal mode interval of the laser unit 31 may be the same 0.75 nm interference period of the waveguide 33.

Instead of shortening the resonator of the laser unit 31, in another embodiment, a second Fabry-Perot interference structure corresponding to about 130 μm may be provided in the laser unit 31 and samples the longitudinal mode of the laser unit 31. For example, by setting the resonator length of the laser unit 31 to about 260 μm and providing a structural modification having a width of about 100 nm at a position at nearly the center thereof, the odd modes may be effectively suppressed, and the longitudinal mode interval may be doubled. Specifically, a laser unit 31 having a resonator length of about 260 μm may be used to realize an equivalent longitudinal mode interval to a 130 μm laser unit and match the interference period of the waveguide 33. in this embodiment, the interference period of the waveguide 33 and the longitudinal mode interval may match as much as possible. However, if kept to a difference within about 5%, or more preferably within about 2%, nearly equivalent effects are obtained. The reason is that the maximum changes are kept to approximately 10% when the waveguide length is not controlled by suppressing discontinuous hops of the longitudinal mode to a difference within 5% because the hops are usually limited to about 1 nm to about 2 nm (two to three times the longitudinal mode interval). The emitted power fluctuations caused by interference have a maximum of about 30%. Therefore, in this embodiment, the fluctuations may be suppressed to about 3% or lower, which does not present a problem in practice.

In one exemplary embodiment, a slider 30 having a thickness of about 230 μm was used, but in another exemplary embodiment, a thinner slider has been used, because the manufacturability of the head is improved, the cost is reduced and the light source mounted space for thermally-assisted magnetic recording is ensured.

Figure 6A:
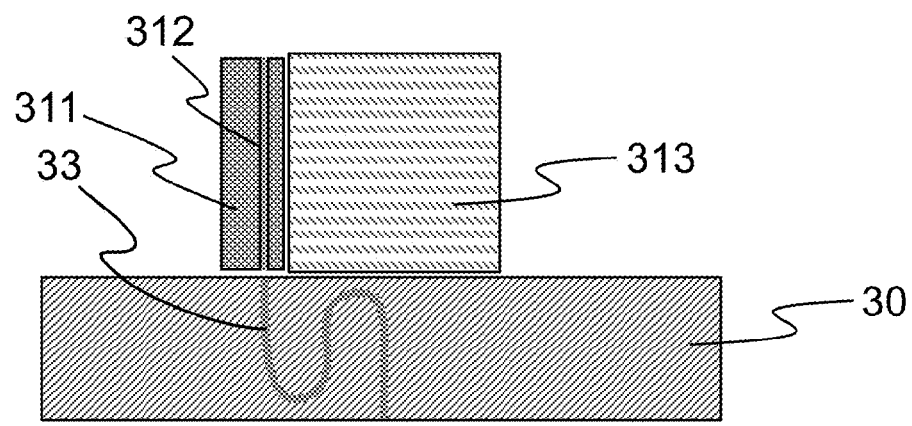
FIGS. 6A-6B show examples of curved waveguides in a slider, in several embodiments.
Figure 6B:
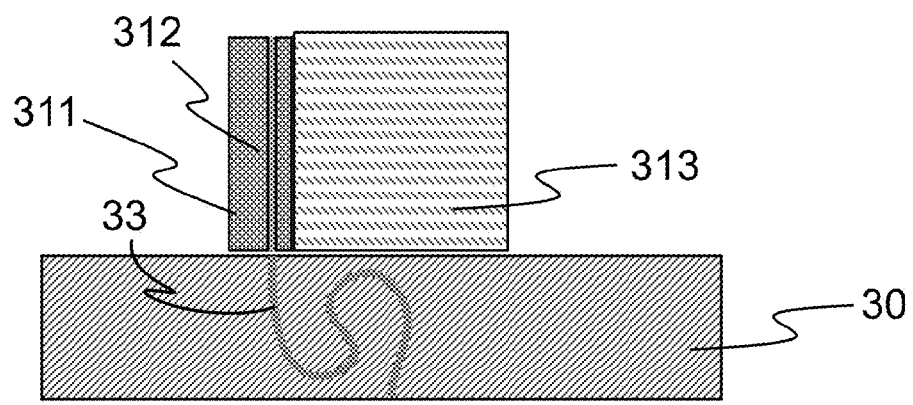

Now referring to FIGS. 6A-6B, an example of a waveguide 33 in a slider 30 having a thickness of 180 μm is shown. In the example in FIG. 6A, by bending the waveguide 33 in the slider 30, the effective length of the waveguide 33 in the slider 30 lengthens and may be increased to about 500 μm or more. As described previously, it is desirable to have the length of the waveguide 33 at least 1.5 times the length of the laser resonator 312, and as a result a laser unit having a resonator length of no more than about 300 μm may be used.

In FIG. 6B, the length of the waveguide 33 is further lengthened to about 650 μm or more. This allows for a laser unit having a length of about 400 μm. In these two working examples, the minimum radius of curvature becomes at least about 30 μm by bending the waveguide 33. In addition, the refractive index of the waveguide core 331 is about 2.1, and the refractive index of the cladding 332 is about 1.65. Because the refractive index difference is large, light is satisfactorily confined to the waveguide 33 even in curved portions, and propagation losses of light caused by the curves does not substantially occur (e.g., losses of less than about 1%, 5%, or 10% of the energy based on the difference and radius of curvature). In addition, there is a concern about an increase in propagation losses by increasing the length of the waveguide 33; however, the propagation losses are controlled to about 2 dB/cm or less depending on management of the waveguide 33 forming process. Therefore, even when the waveguide 33 is 650 μm long or longer, the propagation loss has a maximum value of about 0.065 dB, that is, it may be reliably suppressed to about 1.3% or less, which does not present a problem in actual use.

Figure 7A:
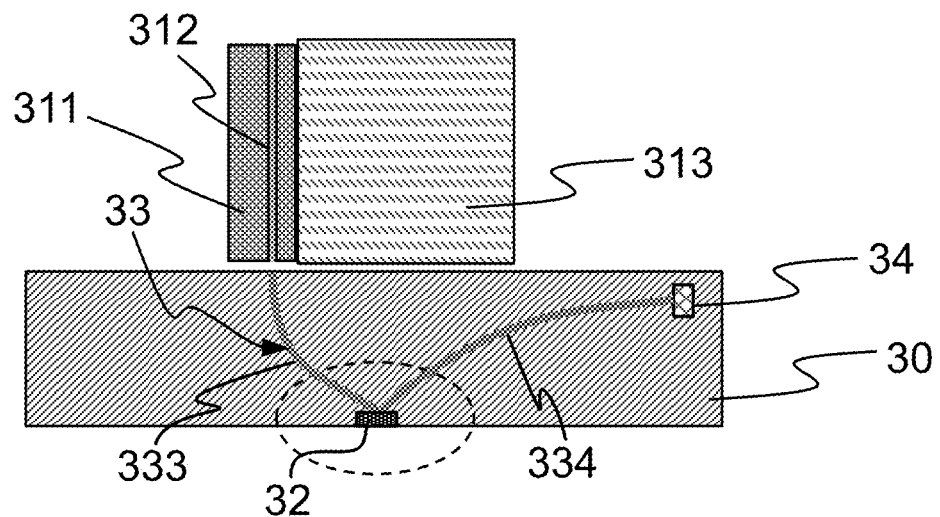
FIG. 7A-7B show examples of curved waveguides in a slider that incorporate oblique reflection by a near-field light-generating element, according to several embodiments.
Figure 7B:
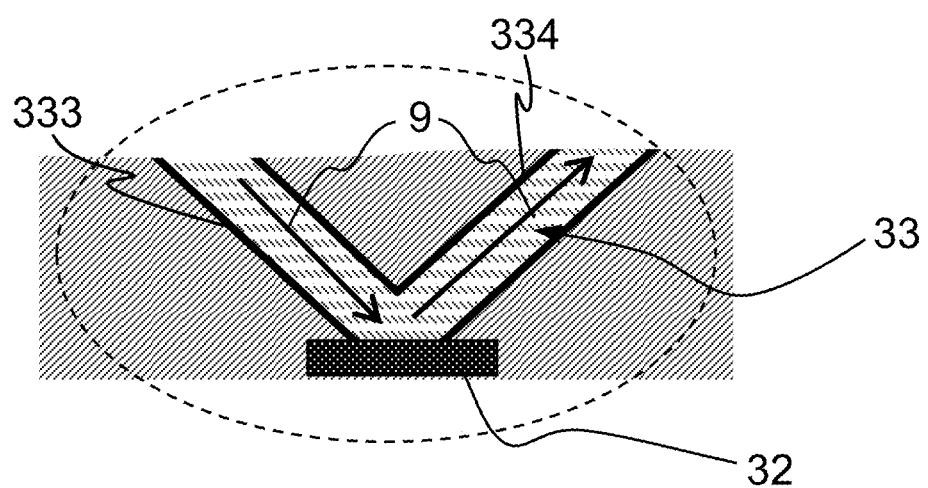

FIGS. 7A-7B show a bent reflective waveguide 33 that is configured to lengthen the waveguide 33, according to another embodiment. The light incident on the waveguide 33 from the laser unit as shown in FIG. 7A is irradiated at an incident angle of about 40° on the near-field light-generating element 32 in the first bent waveguide 333. On the near-field light-generating element 32, approximately 15% of the light is reflected.

FIG. 7B is an expanded view of the waveguide structure near the near-field light-generating element 32. The reflected laser light 9 passes through the second bent waveguide 334 and is introduced to a power monitoring element or power sensor 34, as shown in FIG. 7A. Therefore, an effective waveguide length becomes the sum of the first bent waveguide 333 and the second bent waveguide 334, and corresponds to about 650 μm in this example. Thus, this structure may correspond to a laser having a length of about 400 μm. In this working example, the amount of laser light 9 that is reflected in the vicinity of the power sensor 34 and returns to the second waveguide 334, namely, the effective reflectance at the ends of the waveguide 33, is relatively easy to lower to about 1% or less. An effective reflectance of the end surfaces may be further lowered to about 1%*15%*15%=0.0225% or less when a 15% reflectance of the near-field light-generating element 32 is considered. By lowering the reflectance at the end surfaces, a reduction effect is anticipated.

FIG. 9 shows an example that utilizes a magnetic head according to embodiments described herein to examine how the intensity of light emitted by the waveguide close to the near-field light-generating element is changed by fluctuations in the ambient temperature, e.g., laser unit or laser diode (LD) temperature, with different combinations of lengths of the laser resonator and the waveguide. These results show that mode hopping is produced when the interference conditions of the waveguide and the laser are varied because the laser wavelength is changed by temperature fluctuations. Therefore, the power changes abruptly and discontinuously with respect to the temperature. These fluctuations were examined for various lengths of the laser and the waveguide. FIG. 10 summarizes the results for the ratio of the optical lengths of the laser resonator and the waveguide. The optical length ratio becomes an integer multiple, and the power fluctuations assume extremely small values. When the ratio is about 1.0, that is, the optical lengths of the resonator and the waveguide match, the effect of reducing power fluctuations is substantial.

Figure 11:
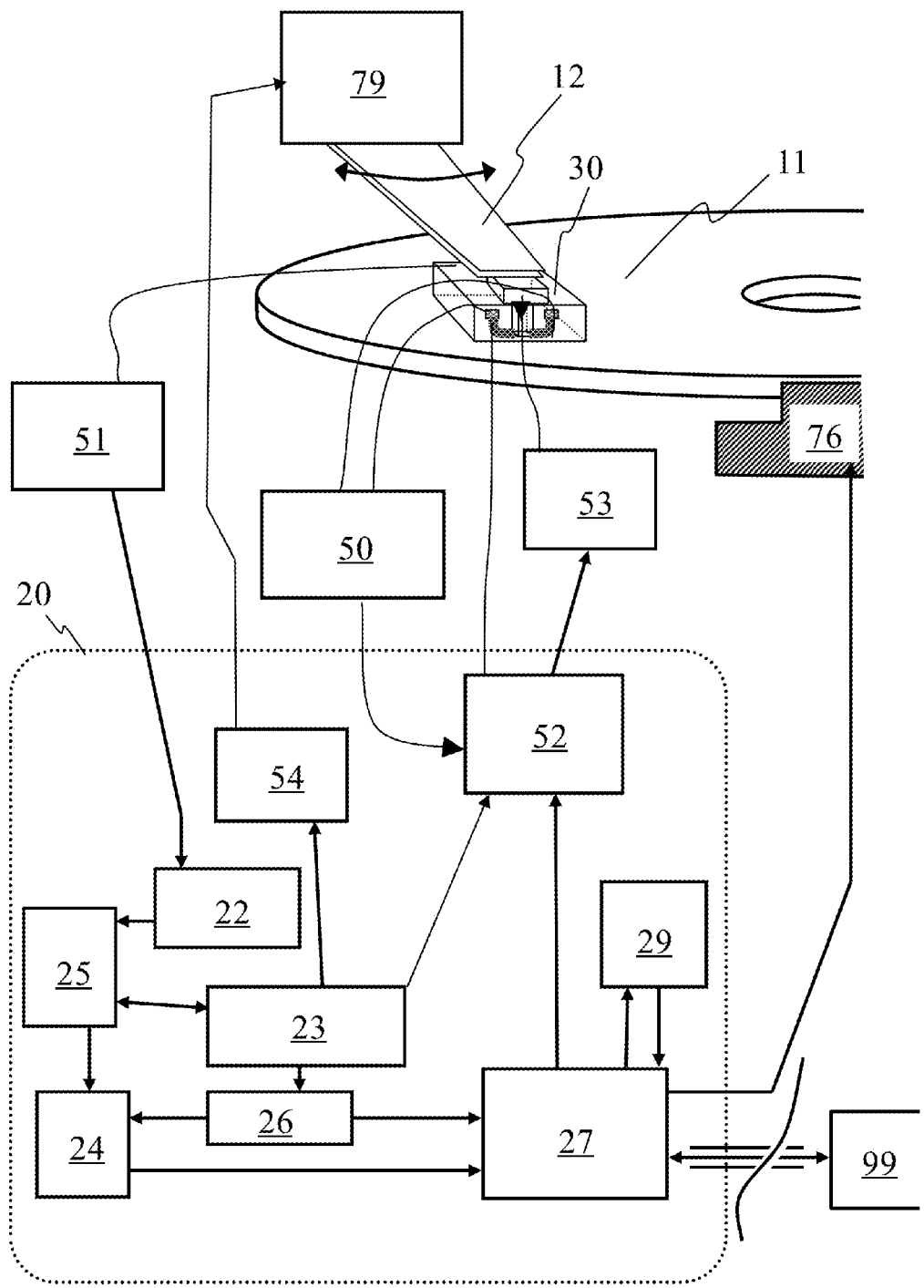
FIG. 11 shows a detailed diagram of a magnetic recording device according to one embodiment.

Next, FIG. 11 is used to explain the structure of a thermally-assisted magnetic recording device using a read/write head according to embodiments described herein. A slider 30 supported by a suspension 12 is configured to float at a flying height of about 3 nm above a magnetic medium 11 and is driven by a voice coil motor (VCM) actuator 79 for accessing in the track direction and for servo tracking. Although not explained in detail, this embodiment may provide an additional actuator constructed from a piezo element in the suspension for precisely implementing higher precision track positioning. In addition, a thermally driven actuator is embedded in a slider to precisely control the flying height.

When reading, the resistance of a CPP/GMR sensor element (not shown) mounted above the slider is detected by a pre-amplifier 51, pre-processed, such as via equalization by a signal detection circuit 22 installed in a controller (SOC) 20, and sent to a signal processing circuit 25. The signal processing circuit 25 synchronizes and demodulates based on position data and timing information in a position/address detection circuit 23, sends the data that has been processed, for example, error correction in a demodulation circuit 24 after being decoded in a decoding circuit 26, to a microprocessor 27 and transferred to a high-order device 99. Information may be stored to a memory 29 for use in subsequent functions. A servo circuit 54 controls a VCM actuator 79 based on data detected in the position/address detection circuit 23.

During recording, the VCM actuator 79 is servo-controlled based on the position/address signal detected by the position/address detection circuit 23 during a read, and the head is positioned in a sector specified by the high-order device 99. Then the user data encoded by the write control circuit 52 drive the laser unit 31 mounted above the slider 30 by the laser driver 53 and the write head embedded in the slider 30, and thermally-assisted recording is conducted. Thermally-assisted recording heats a local region on the medium during recording to an appropriate temperature, and the recording magnetic field is applied by the write head to that local region. The drive current of the laser unit 31 is precisely controlled to heat to the appropriate temperature. In one embodiment, by detecting the resistance of the power monitor element provided near the near-field light-generating element 32 by a resistance detection circuit 50, the temperature of the near-field light-generating element 32 is monitored. Then based on that temperature information, the drive current of the laser unit 31 is precisely controlled.

During any reading and/or writing operation the spindle motor 76 spins the spindle (and thus the medium 11) to move the medium 11 across the slider 30.

Next, the control method of the energy injected to the near-field light-generating element of this working example is explained. In a head for thermally-assisted magnetic recording according to one embodiment, as shown in FIG. 3B, the light intensity near the terminal end of the waveguide, that is, the intensity of the light irradiating the near-field light-generating element, has a linear correlation relationship with respect to the intensity of the laser light emitted from the laser unit. Thus, the output of the power monitoring element is detected. The power of the light irradiating the near-field light-generating element may be controlled to be constant by feedback control so that the detected value becomes constant.

Referring again to FIG. 11, in practice, the write control circuit 52 performs this control. The bandwidth of the feedback control may be from about 10 kHz to about 100 kHz to enable responses to temperature fluctuations, for example, in the laser unit. Because the temperature of the power monitoring element responds at a time constant of about 1 µs or less, control is possible at a bandwidth of up to 1 MHz. However, the effects of interference (crosstalk) with recorded data are considered, and the control bandwidth may be 100 kHz or lower.

Figure 12:
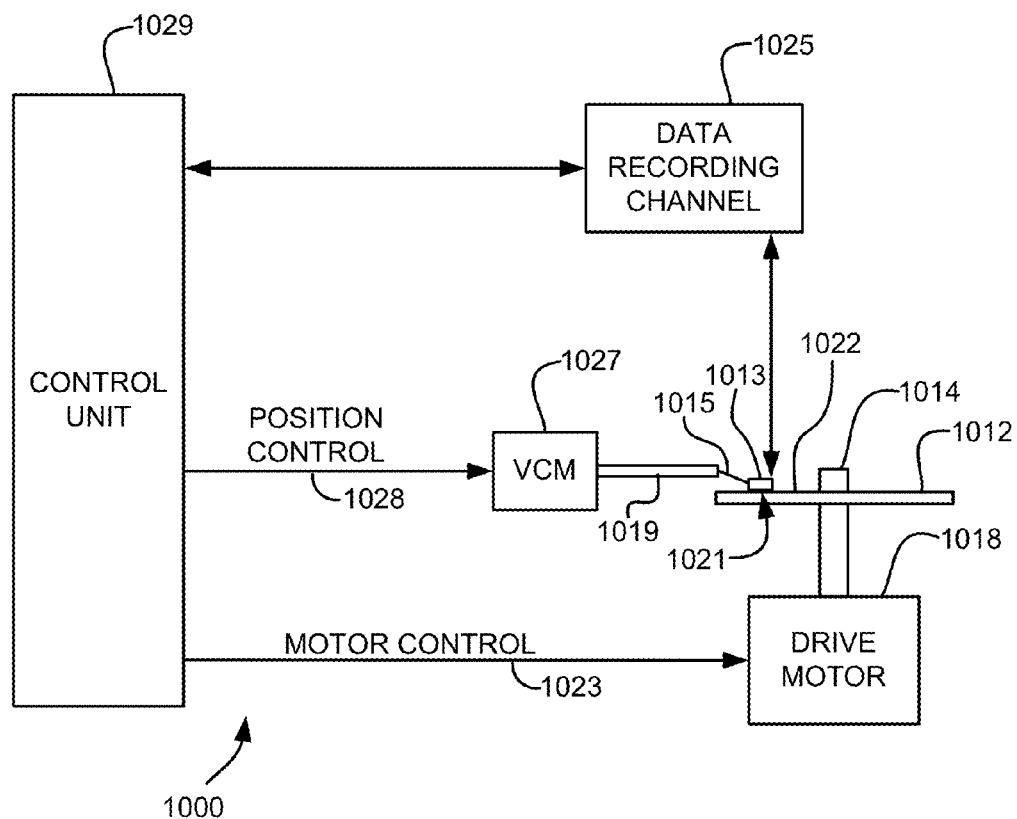
FIG. 12 is a simplified drawing of a magnetic recording disk drive system.

Referring now to FIG. 12, there is shown a magnetic data storage device 1000 (which may be a disk drive) in accordance with one embodiment of the present invention. As shown in FIG. 12, at least one rotatable magnetic medium (e.g., magnetic disk) 1012 is supported on a spindle 1014 and rotated by a drive mechanism, which may include a disk drive motor 1018. The magnetic recording on each disk is typically in the form of an annular pattern of concentric data tracks (not shown) on the disk 1012. Thus, the disk drive motor 1018 preferably passes the magnetic disk 1012 over the magnetic read/write portions 1021, described immediately below.

At least one slider 1013 is positioned near the disk 1012, each slider 1013 supporting one or more magnetic read/write portions 1021, e.g., of a magnetic head according to any of the approaches described and/or suggested herein. As the disk 1012 rotates, slider 1013 is moved radially in and out over disk surface 1022 so that portions 1021 may access different tracks of the disk 1012 where desired data are recorded and/or to be written. Each slider 1013 is attached to an actuator arm 1019 using a suspension 1015. The suspension 1015 provides a slight spring force which biases slider 1013 against the disk surface 1022. Each actuator arm 1019 is attached to an actuator 1027. The actuator 1027 as shown in FIG. 12 may be a VCM. The VCM comprises a coil movable within a fixed magnetic field, the direction and speed of the coil movements being controlled by the motor current signals supplied by controller 1029.

During operation of the disk storage system, the rotation of disk 1012 generates an air bearing between slider 1013 and disk surface 1022 which exerts an upward force or lift on the slider 1013. The air bearing thus counter-balances the slight spring force of suspension 1015 and supports slider 1013 off and slightly above the disk surface 1022 by a small, substantially constant spacing during normal operation. Note that in some embodiments, the slider 1013 may slide along the disk surface 1022.

The various components of the disk storage system are controlled in operation by control signals generated by controller 1029, such as access control signals and internal clock signals. Typically, controller 1029 comprises logic control circuits, storage (e.g., memory), and a microprocessor. In a preferred approach, the controller 1029 is electrically coupled (e.g., via wire, cable, line, etc.) to the one or more magnetic read/write portions 1021, for controlling operation thereof. The controller 1029 generates control signals to control various system operations such as drive motor control signals on line 1023 and head position and seek control signals on line 1028. The control signals on line 1028 provide the desired current profiles to optimally move and position slider 1013 to the desired data track on disk 1012. Read and write signals are communicated to and from read/write portions 1021 by way of recording channel 1025.

The above description of a typical magnetic disk storage system, and the accompanying illustration of FIG. 12 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first (main) and second (return) pole piece layers. The pole piece layers may be connected at a back gap. Currents are conducted through the coil layer, which produce magnetic fields around the main pole piece. The magnetic fields at the media facing side for the purpose of writing bits of magnetic field information in tracks on moving media, such as in circular tracks on a rotating magnetic disk, while a local thermal spot is generated by the near-field light-generating element.

The magnetic data storage device of FIG. 12 may include at least one thermally-assisted magnetic head as described herein according to any embodiment, a magnetic medium (such as a disk 1012), a drive mechanism (such as disk drive motor 1018) for passing the magnetic medium over the at least one thermally-assisted magnetic head, and a controller 1029 electrically coupled to the at least one thermally-assisted magnetic head for controlling operation of the at least one thermally-assisted magnetic head.

Figure 13:
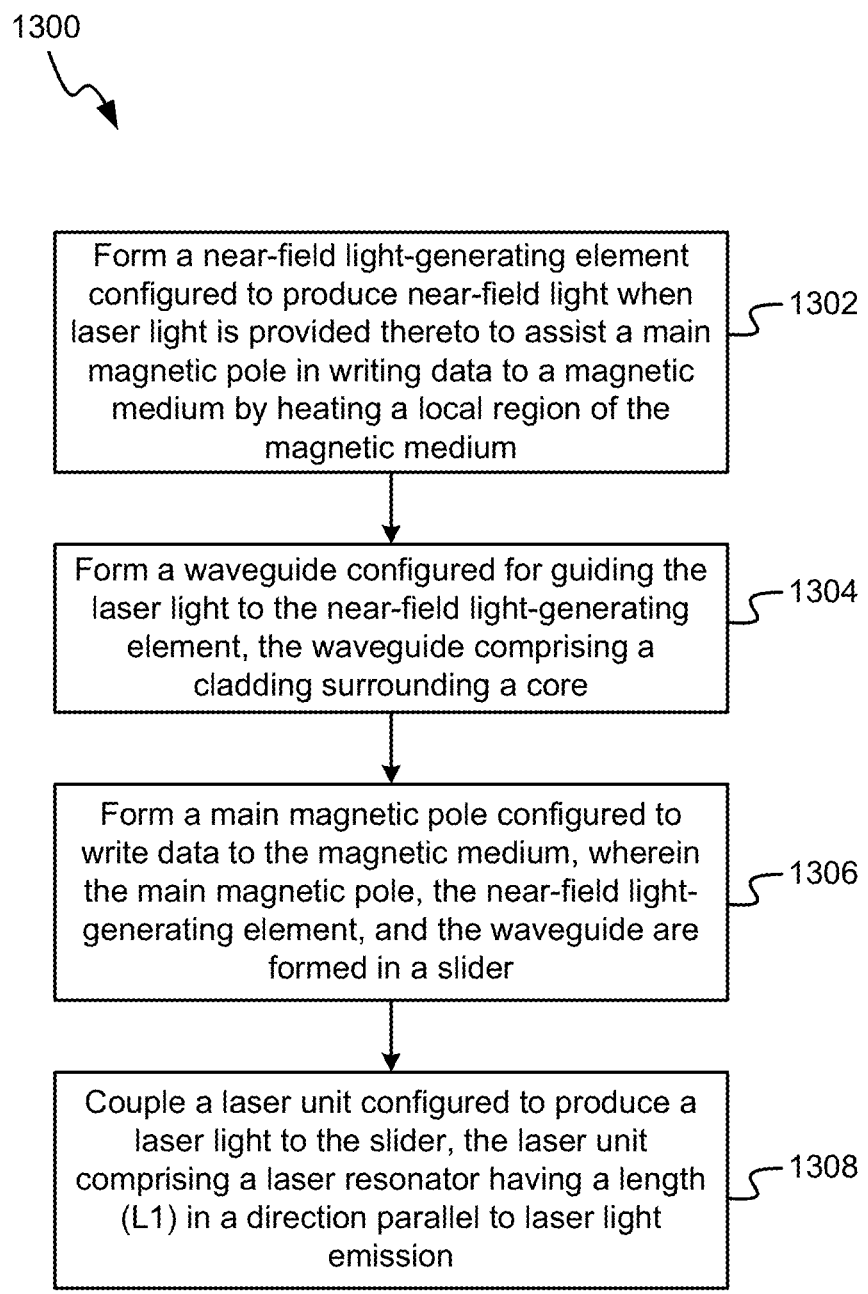
FIG. 13 shows a flowchart of a method according to one embodiment.

Now referring to FIG. 13, a method 1300 for manufacturing a thermally-assisted magnetic head is described, according to one embodiment.

As shown in FIG. 13, method 1300 may initiate with operation 1302. In operation 1302, a near-field light-generating element is formed. The near-field light-generating element is configured to produce near-field light when laser light is provided thereto to assist a main magnetic pole in writing data to a magnetic medium by heating a local region of the magnetic medium.

In one embodiment, the near-field light-generating element may comprise an isosceles triangular pyramid shape at a media-facing surface of the device.

In operation 1304, a waveguide configured for guiding the laser light to the near-field light-generating element is formed, the waveguide comprises a cladding surrounding a core.

In operation 1306, a main magnetic pole configured to write data to a magnetic medium is formed. In one embodiment, the main magnetic pole may be positioned in a down-track direction from the near-field light-generating element.

In one embodiment, the main magnetic pole, the near-field light-generating element, and the waveguide may be formed in a slider.

In operation 1308, a laser unit configured to produce a laser light is coupled to the slider, the laser unit comprising a laser resonator (cavity) having a length (L1) in a direction parallel to laser light emission, such as perpendicular to a media-facing surface of the slider, parallel to the media-facing surface of the slider, or in some other orientation that would be appreciated by one of skill in the art upon reading the present descriptions.

In one approach, the laser unit may utilize GaAs having a refractive index of about 3.5, or some other suitable material capable of producing laser light having a sufficient power to aid in magnetic recording as known by one of skill in the art.

In one approach, the waveguide may have a non-linear shape with a radius of curvature of at least about 30 μm. In another approach, the waveguide may have a length of about 1.5 times a length of the laser resonator or greater. And in yet another approach, the waveguide may comprise a reflective element positioned between two linear portions.

Each of the main magnetic pole, the near-field light-generating element, and the waveguide may be formed in a slider having a length (L2) in the direction perpendicular to the media-facing surface of the slider.

An interval of a longitudinal mode of the laser resonator is equal to within about 5% of an integer multiplier of an optical interference period of the waveguide. In a more preferable embodiment, the interval of the longitudinal mode of the laser resonator may be equal to within about 2% of the integer multiplier of the optical interference period of the waveguide.

In a further embodiment, the integer multiplier may be selected from a group consisting of: 1, 2, 3, and 4, or more.

In another embodiment, $n_{WG} \cdot h_{WG} = k \cdot n_C \cdot h_C$ may be satisfied, where k is the integer multiplier, $n_{WG}$ is an average effective refractive index (propagation constant) of the waveguide, $h_{WG}$ is a length of the waveguide, $n_C$ is an average effective refractive index (propagation constant) of the laser resonator, and $h_C$ is a length of the laser resonator.

In a further embodiment, the average effective refractive index (propagation constant) of the waveguide, $n_{WG}$, may be about 2.0, the length of the slider, L2, may be about 230 μm, a center wavelength, λ, of the laser light may be about 830 μm, and the length of the laser resonator, $h_C$, may be about 130 μm or an integer multiplier thereof. As the values of the lengths vary from their preferred values described above, the advantages of using a construction as described is reduced. Accordingly, as close to the preferred values as is possible is preferred.

In one embodiment, a device comprises a laser unit configured to produce a laser light, the laser unit comprising a laser resonator having a length (L1) in a direction parallel to laser light emission (e.g., perpendicular to a media-facing surface of a slider, parallel to a media-facing surface of the slider, etc.) and the slider having a length (L2) in a direction perpendicular to a media-facing surface of the slider, the slider comprising: a main magnetic pole configured to write data to a magnetic medium, a near-field light-generating element configured to produce near-field light when laser light is provided thereto to assist the main magnetic pole in writing data to the magnetic medium by heating a local region of the magnetic medium, and a waveguide configured for guiding the laser light to the near-field light-generating element, the waveguide comprising a cladding surrounding a core. An interval of a longitudinal mode of the laser resonator is equal to within about 5% of an integer multiplier of an optical interference period of the waveguide.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A device, comprising:
   a laser unit configured to produce a laser light, the laser unit comprising a laser resonator having a length (L1) in a direction parallel to laser light emission; and
   a slider having a length (L2) in a direction perpendicular to a media-facing surface of the slider, the slider comprising:
   a main magnetic pole configured to write data to a magnetic medium;
   a near-field light-generating element configured to produce near-field light when laser light is provided thereto to assist the main magnetic pole in writing data to the magnetic medium by heating a local region of the magnetic medium; and
   a waveguide configured for guiding the laser light to the near-field light-generating element, the waveguide comprising a cladding surrounding a core, wherein an interval of a longitudinal mode of the laser resonator is equal to within about 5% of an integer multiplier of an optical interference period of the waveguide.

2. The device as recited in claim 1, wherein the near-field light-generating element comprises an isosceles triangular pyramid shape at a media-facing surface of the device.

3. The device as recited in claim 1, wherein the main magnetic pole is positioned in a down-track direction from the near-field light-generating element.

4. The device as recited in claim 1, wherein the integer multiplier is selected from a group consisting of: 1, 2, 3, and 4.

5. The device as recited in claim 1, wherein $n_{WG} \cdot h_{WG} = k \cdot n_C \cdot h_C$ is satisfied, wherein k is the integer multiplier, $n_{WG}$ is an average effective refractive index (propagation constant) of the waveguide, $h_{WG}$ is a length of the waveguide, $n_C$ is an average effective refractive index (propagation constant) of the laser resonator, and $h_C$ is a length of the laser resonator.

6. The device as recited in claim 5, wherein the average effective refractive index (propagation constant) of the waveguide, $n_{WG}$, is about 2.0, the length of the slider, L2, is about 230 μm, a center wavelength, λ, of the laser light is about 830 μm, and the length of the laser resonator, $h_C$, is about 130 μm or an integer multiplier thereof.

7. The device as recited in claim 1, wherein the interval of the longitudinal mode of the laser resonator is equal to within about 2% of the integer multiplier of the optical interference period of the waveguide.

8. The device as recited in claim 1, wherein the laser unit utilizes GaAs having a refractive index of about 3.5.

9. The device as recited in claim 1, wherein the waveguide has a non-linear shape with a radius of curvature of at least about 30 μm.

10. The device as recited in claim 9, wherein the waveguide has a length of about 1.5 times a length of the laser resonator or greater.

11. The device as recited in claim 1, wherein the waveguide comprises a reflective element positioned between two linear portions.

12. A magnetic data storage system, comprising:
at least one device as recited in claim 1;
a magnetic medium;
a drive mechanism for passing the magnetic medium over the at least one device; and
a controller electrically coupled to the at least one device for controlling operation of the at least one device.

13. A method for forming a thermally-assisted magnetic head, the method comprising:
forming a slider having a length (L2) in a direction perpendicular to a media-facing surface of the slider; and
coupling a laser unit configured to produce a laser light to the slider, the laser unit comprising a laser resonator having a length (L1) in a direction parallel to laser light emission;
wherein the slider comprises:
a main magnetic pole configured to write data to a magnetic medium;
a near-field light-generating element configured to produce near-field light when laser light is provided thereto to assist the main magnetic pole in writing data to the magnetic medium by heating a local region of the magnetic medium; and
a waveguide configured for guiding the laser light to the near-field light-generating element, the waveguide comprising a cladding surrounding a core,
wherein an interval of a longitudinal mode of the laser resonator is equal to within about 5% of an integer multiplier of an optical interference period of the waveguide.

14. The method as recited in claim 13, wherein the near-field light-generating element comprises an isosceles triangular pyramid shape at a media-facing surface of the device, and wherein the main magnetic pole is positioned in a down-track direction from the near-field light-generating element.

15. The method as recited in claim 13, wherein $n_{WG} \cdot h_{WG} = k \cdot n_C \cdot h_C$ is satisfied, wherein k is the integer multiplier, $n_{WG}$ is an average effective refractive index (propagation constant) of the waveguide, $h_{WG}$ is a length of the waveguide, $n_C$ is an average effective refractive index (propagation constant) of the laser resonator, and $h_C$ is a length of the laser resonator.

16. The method as recited in claim 15, wherein the average effective refractive index (propagation constant) of the waveguide, $n_{WG}$, is about 2.0, the length of the slider, L2, is about 230 μm, a center wavelength, λ, of the laser light is about 830 μm, and the length of the laser resonator, $h_C$, is about 130 μm or an integer multiplier thereof, wherein the integer multiplier is selected from a group consisting of: 1, 2, 3, and 4.

17. The method as recited in claim 13, wherein the interval of the longitudinal mode of the laser resonator is equal to within about 2% of the integer multiplier of the optical interference period of the waveguide.

18. The method as recited in claim 13, wherein the laser unit utilizes GaAs having a refractive index of about 3.5.

19. The method as recited in claim 13, wherein the waveguide has a non-linear shape with a radius of curvature of at least about 30 μm, and wherein the waveguide has a length of about 1.5 times a length of the laser resonator or greater.

20. The method as recited in claim 13, wherein the waveguide comprises a reflective element positioned between two linear portions.

* * * * *